United States Patent
Hur et al.

(10) Patent No.: US 12,084,538 B2
(45) Date of Patent: Sep. 10, 2024

(54) METHOD FOR PRODUCING POLYMER

(71) Applicant: LG Chem, Ltd., Seoul (KR)

(72) Inventors: Yoon Hyung Hur, Daejeon (KR); Je Gwon Lee, Daejeon (KR); Sung Soo Yoon, Daejeon (KR); No Jin Park, Daejeon (KR); Eun Young Choi, Daejeon (KR); Se Jin Ku, Daejeon (KR); Mi Sook Lee, Daejeon (KR); Hyung Ju Ryu, Daejeon (KR); Na Na Kang, Daejeon (KR); Eung Chang Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 480 days.

(21) Appl. No.: 16/630,159

(22) PCT Filed: Jul. 16, 2018

(86) PCT No.: PCT/KR2018/008016
§ 371 (c)(1),
(2) Date: Jan. 10, 2020

(87) PCT Pub. No.: WO2019/013600
PCT Pub. Date: Jan. 17, 2019

(65) Prior Publication Data
US 2020/0354487 A1    Nov. 12, 2020

(30) Foreign Application Priority Data
Jul. 14, 2017 (KR) .................. 10-2017-0089866

(51) Int. Cl.
C08F 8/18 (2006.01)
C08F 4/46 (2006.01)
(Continued)

(52) U.S. Cl.
CPC .................. *C08F 8/18* (2013.01); *C08F 4/46* (2013.01); *C08F 4/461* (2013.01); *C08F 4/463* (2013.01);
(Continued)

(58) Field of Classification Search
CPC ...... C08F 8/18; C08F 8/20; C08F 8/24; C08F 4/44; C08F 4/46; C08F 4/461; C08F 4/463; C08F 4/48; C08F 4/484
See application file for complete search history.

(56) References Cited

U.S. PATENT DOCUMENTS

| | | | |
|---|---|---|---|
| 4,252,925 A | 2/1981 | Fukuda et al. | |
| 4,351,924 A * | 9/1982 | Andrews | C08F 8/02 560/205 |

(Continued)

FOREIGN PATENT DOCUMENTS

| | | |
|---|---|---|
| CN | 100478362 C | 4/2009 |
| CN | 110799553 A | 2/2020 |

(Continued)

OTHER PUBLICATIONS

Search report from International Application No. PCT/KR2018/008016, mailed Oct. 16, 2018.
(Continued)

*Primary Examiner* — Ling Siu Choi
*Assistant Examiner* — David L Miller
(74) *Attorney, Agent, or Firm* — Lerner David LLP

(57) ABSTRACT

A method for producing a polymer containing metal atoms or halogen atoms at the terminals thereof with excellent efficiency while minimizing or eliminating side reactions or the like is provided. The method can also freely control molecular weight characteristics of the polymer.

10 Claims, 5 Drawing Sheets

(51) Int. Cl.
*C08F 4/48* (2006.01)
*C08F 8/42* (2006.01)
*C08F 20/14* (2006.01)
*C08F 20/16* (2006.01)
*C08F 8/20* (2006.01)
*C08F 8/24* (2006.01)

(52) U.S. Cl.
CPC ............... *C08F 4/48* (2013.01); *C08F 4/484* (2013.01); *C08F 8/42* (2013.01); *C08F 20/14* (2013.01); *C08F 20/16* (2013.01); *C08F 8/20* (2013.01); *C08F 8/24* (2013.01)

(56) References Cited

U.S. PATENT DOCUMENTS

| | | | |
|---|---|---|---|
| 5,677,387 | A | 10/1997 | Bayard et al. |
| 6,384,146 | B1 * | 5/2002 | Ruckenstein ......... C08F 297/02 525/247 |
| 10,815,314 | B2 * | 10/2020 | Lee ..................... C08C 19/25 |
| 2007/0225457 | A1 | 9/2007 | Takahashi et al. |
| 2010/0035158 | A1 * | 2/2010 | Kato ..................... C08L 53/025 429/316 |
| 2020/0354487 | A1 | 11/2020 | Hur et al. |

FOREIGN PATENT DOCUMENTS

| | | |
|---|---|---|
| EP | 1775308 A1 | 4/2007 |
| EP | 3640267 A1 | 4/2020 |
| JP | H0812709 A | 1/1996 |
| JP | H09511785 A | 11/1997 |
| JP | 200288109 A | 3/2002 |
| JP | 2007277542 A | 10/2007 |
| JP | 2011012279 A | 1/2011 |
| JP | 2013185005 A * | 9/2013 |
| JP | 2020525583 A | 8/2020 |
| KR | 19960029355 | 8/1996 |
| KR | 0133492 B1 | 12/1997 |
| KR | 100415985 B1 | 1/2004 |
| WO | 2005121189 A1 | 12/2005 |

OTHER PUBLICATIONS

Mengel, C., et al., "Photocrosslinkable Star Polymers: Precursors for Model Polyelectrolyte Networks." Macromolecular Chemistry and Physics, 2001, vol. 202, No. 7, pp. 1138-1149.

Aoshima, H., et al., "Direct Mechanistic Transformations from Isotactic or Syndiotactic Living Anionic Polymerications of Methyl Methacrylate into Metal-catalyzed Living Radical LPolymerizations." ACS Macro Letters, 2013, vol. 2, No. 1, pp. 72-76.

Varshney, S. K., et al., "Anionic Polymerization of (Meth)acrylic Monomers. 4. Effect of Lithium Salts as Ligands on the "Living" Polymerization of Methyl Methacrylate Using Monofunctional Initiators." Macromolecules, 1990, vol. 23, pp. 2618-2622.

Ji, H., et al., "Anionic Synthesis of Epoxy End-Capped Polymers." Macromolecular Chemistry and Physics, 2007, vol. 208, No. 8, pp. 807-814.

Allen, R. D., et al., "Preparation of High Purity, Anionic Polymerization Grade Alkyl Methacrylate Monomers." Polymer Bulletin, Accepted Jan. 15, 1986, vol. 15, No. 2, pp. 127-134.

Extended European Search Report with Written Opinion for Application No. 18832905.6 dated Apr. 9, 2020, 12 pages.

Takenaka, et al., "Synthesis of end-functionalized polymer by means of living anionic polymerization. 4. Synthesis of polyisoprene and polystyrene with epoxy termini by reaction of their anionic living polymers with 2-promoethyloxirane," Polymer International, Aug. 1, 1995, pp. 291-295, vol. 37, No. 4, XP055682073.

Chinese Search Report for Application No. 201880042567.1 dated Mar. 31, 2021, pp. 1-6.

Park, J. et al., "Facile Synthesis for Well-Defined A2B Miktoarm Star Copolymer of Poly(3-hexylthiophene) and Poly (methyl methacrylate) by the Combination of Anionic Polymerization and Click Reaction", Journal of Polymer Science. Part A: Polymer Chemistry, Feb. 2013, pp. 2225-2232, vol. 51, No. 10.

Masayuki Yamada et al: "Synthesis of Side-Chain Liquid Crystalline Homopolymers and Block Copolymers with Well-Defined Structures by Living Anionic Polymerization and Their Thermotropic Phase Behavior", Macromolecules, vol. 28, No. 1, Jan. 1, 1995 (Jan. 1, 1995 ), pp. 50-58.

Park, J., Moon, et al., "Facile synthesis for well-defined A2B miktoarm star copolymer of poly(3-hexylthiophene) and poly(methyl methacrylate) by the combination of anionic polymerization and click reaction," J. Polym. Sci. A Polym. Chem., (Feb. 2013). 8 pgs.

Search Report dated Dec. 13, 2021 from Office Action for Chinese Application No. 201880042567.1 issued Dec. 17, 2021. 3 pgs.

Wang, Guojian, "The Modern Methods and Technology of Polymer Synthesis," Tongji University Press (Jul. 2013) 7 pgs.

* cited by examiner

[Figure 1]
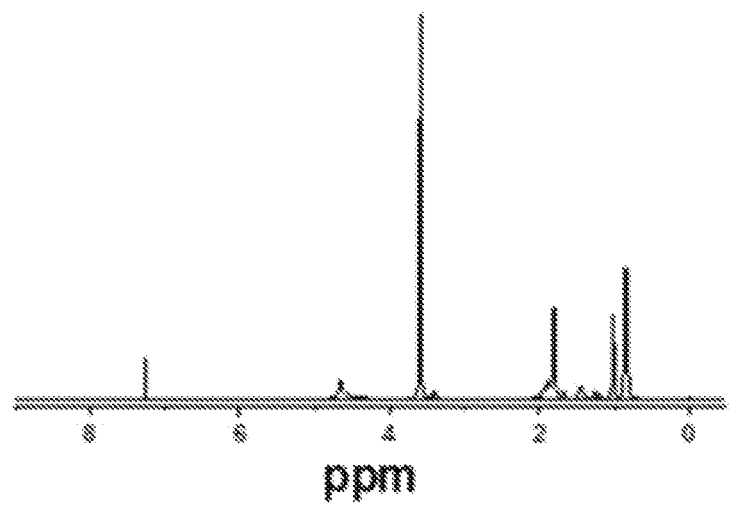
[Figure 2]
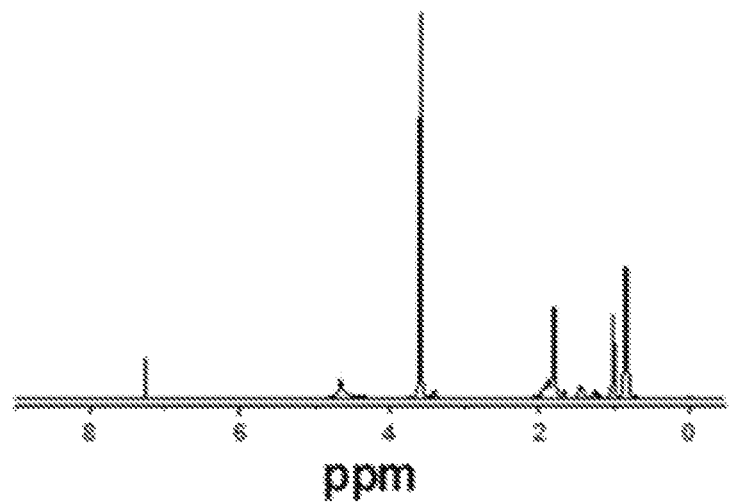

[Figure 3]
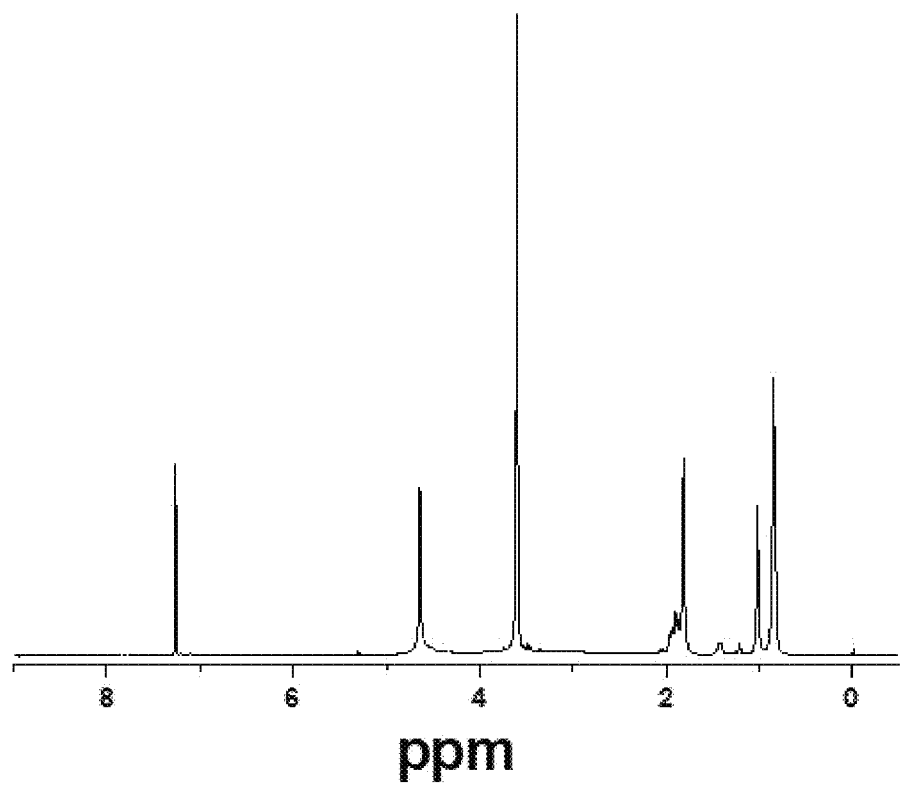
[Figure 4]
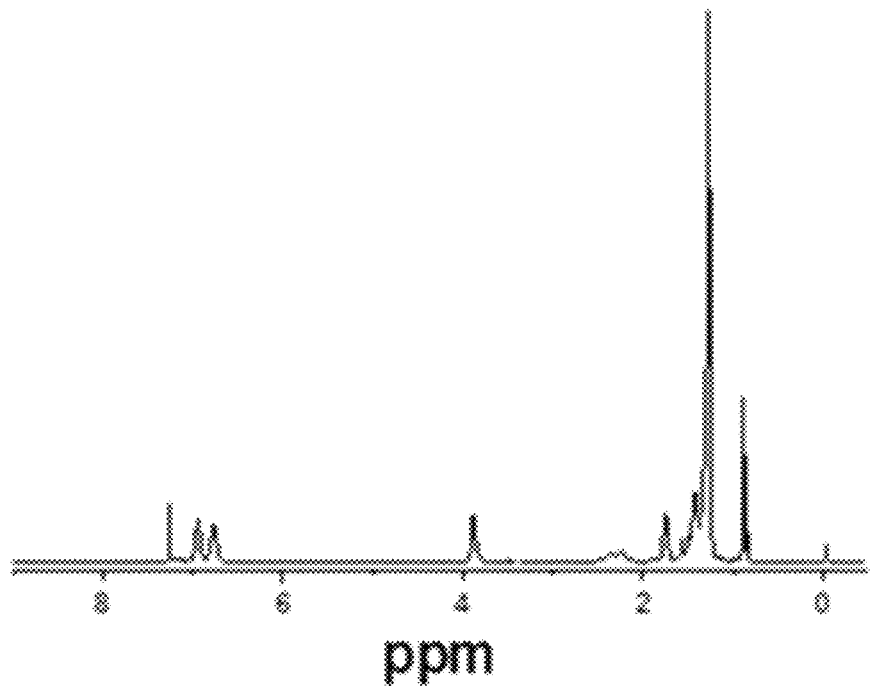

[Figure 5]
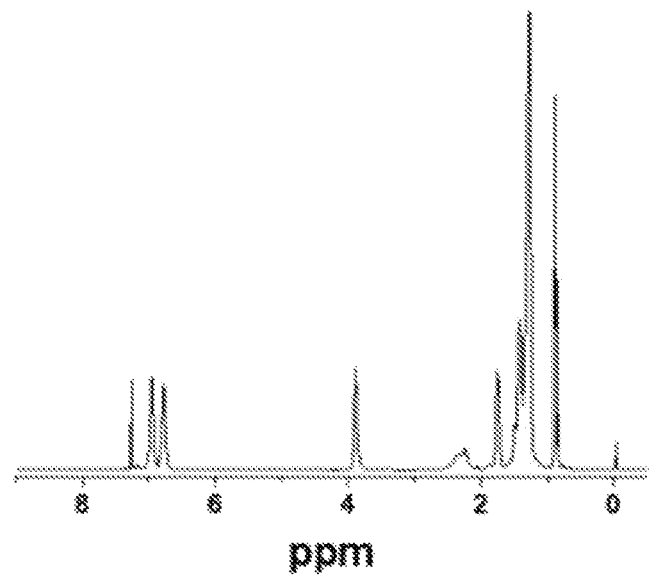
[Figure 6]
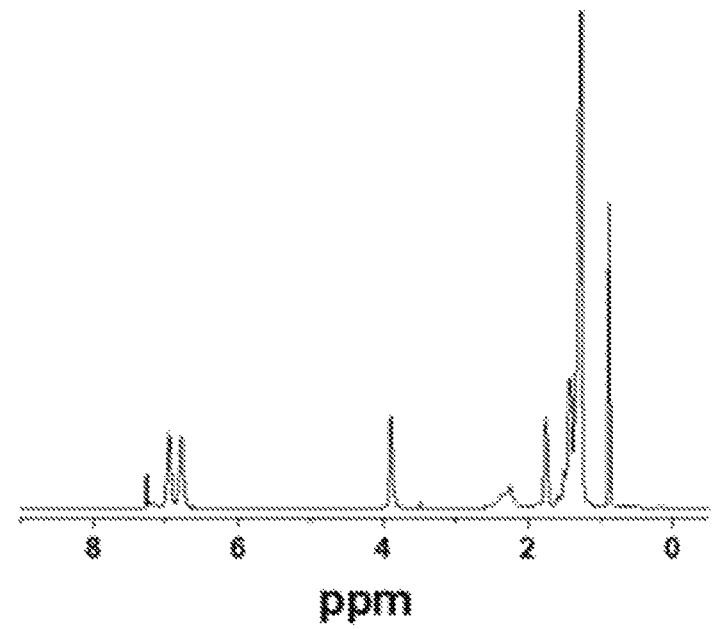

[Figure 7]
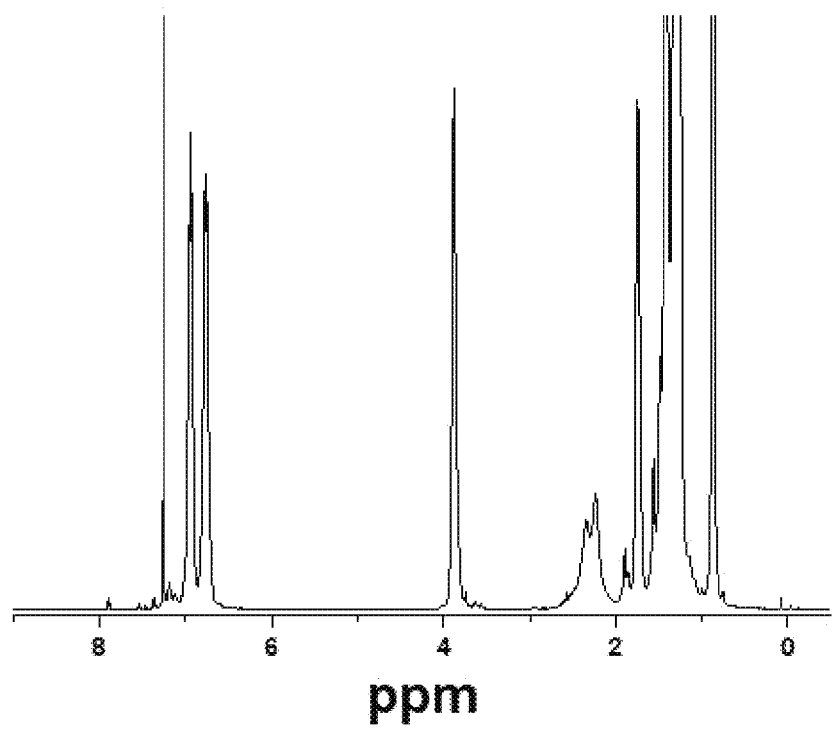
[Figure 8]
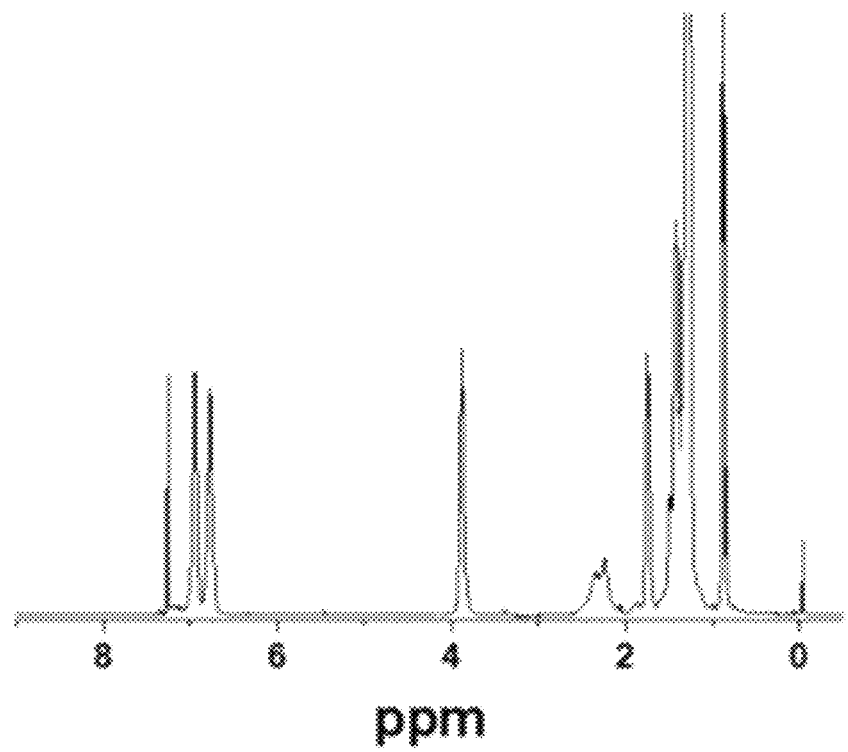

[Figure 9]
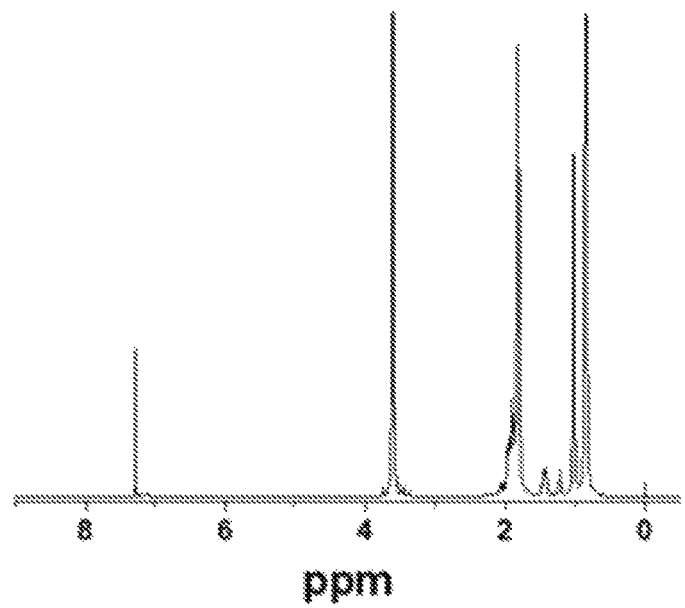

METHOD FOR PRODUCING POLYMER

CROSS-REFERENCE TO RELATED APPLICATIONS

The present application is a national phase entry under 35 U.S.C. § 371 of International Application No. PCT/KR2018/008016 filed on Jul. 16, 2018, which claims priority from Korean Patent Application No. 10-2017-0089866 filed on Jul. 14, 2017, the disclosures of which are incorporated herein by reference.

TECHNICAL FIELD

The present application relates to a method for producing a polymer.

BACKGROUND ART

Much research has been made on polymers having halogen elements such as Br or Cl as their terminal groups due to possibility of various applications such as a polymerization initiator. As a method of synthesizing a polymer having a halogen element as its terminal group, there is known a method of synthesizing a polymer using an initiator having a halogen element or synthesizing it by bonding a single molecule having a halogen element to a polymer having a hydroxyl group as its terminal. However, the method of using an initiator containing a halogen element has a problem that only limited polymers can be synthesized due to initiators containing limited halogen elements. Furthermore, in the method of using a polymer having a hydroxyl group as its terminal group, the polymers having a hydroxyl group as the terminal group are limited, and when the single molecule having a halogen element is bound, the efficiency thereof is lowered, so that there are inconveniences and difficulties in purification. Particularly, when a (meth)acrylate derivative is used, there is a problem that a side reaction occurs such that the polymerization is stopped by attacking the carbonyl group of the polymer chain with a growth terminal or attacking the carbonyl group of the monomer with the initiator or the growth terminal.

DISCLOSURE

Technical Problem

The present application relates to a method for producing a polymer. It is an object of the present application to provide a method for producing a polymer which can produce a polymer containing halogen atoms at the terminals thereof with excellent efficiency while minimizing or eliminating side reactions or the like, and can also freely control molecular weight characteristics of the polymer.

Technical Solution

In this specification, the term monovalent or divalent hydrocarbon group may mean a monovalent or divalent residue derived from a compound consisting of carbon and hydrogen or a derivative thereof, unless otherwise specified. Here, as the compound consisting of carbon and hydrogen, alkane, alkene, alkyne or aromatic hydrocarbon can be exemplified.

The term alkyl group herein may mean an alkyl group having 1 to 20 carbon atoms, 1 to 16 carbon atoms, 1 to 12 carbon atoms, 1 to 8 carbon atoms or 1 to 4 carbon atoms, unless otherwise specified. The alkyl group may be a linear, branched or cyclic alkyl group and may optionally be substituted by one or more substituents.

The term alkoxy group herein may mean an alkoxy group having 1 to 20 carbon atoms, 1 to 16 carbon atoms or 1 to 12 carbon atoms, unless otherwise specified. The alkoxy group may be a linear, branched or cyclic alkoxy group and may optionally be substituted by one or more substituents.

The term alkenyl group or alkynyl group herein may mean an alkenyl group or alkynyl group having 2 to 20 carbon atoms, 2 to 16 carbon atoms, 2 to 12 carbon atoms, 2 to 8 carbon atoms, or 2 to 4 carbon atoms, unless otherwise specified. The alkenyl or alkynyl group may be linear, branched or cyclic and may optionally be substituted by one or more substituents.

The term alkylene group herein may mean an alkylene group having 1 to 20 carbon atoms, 1 to 16 carbon atoms, 1 to 12 carbon atoms, 1 to 8 carbon atoms or 1 to 4 carbon atoms, unless otherwise specified. The alkylene group may be a linear, branched or cyclic alkylene group and may optionally be substituted by one or more substituents.

The term alkenylene group or alkynylene group herein may mean an alkenylene group or alkynylene group having 2 to 20 carbon atoms, 2 to 16 carbon atoms, 2 to 12 carbon atoms, 2 to 8 carbon atoms or 2 to 4 carbon atoms, unless otherwise specified. The alkenylene or alkynylene group may be linear, branched or cyclic and may optionally be substituted by one or more substituents.

The term aryl group or arylene group herein may mean, unless otherwise specified, a monovalent or divalent residue derived from a compound comprising one benzene ring structure or a structure in which two or more benzene rings are linked while sharing one or two carbon atoms, or linked by any linker, or a derivative thereof.

The aryl group or the arylene group may be, for example, an aryl group having 6 to 30 carbon atoms, 6 to 25 carbon atoms, 6 to 21 carbon atoms, 6 to 18 carbon atoms or 6 to 13 carbon atoms, unless otherwise specified.

In the present application, the term aromatic structure may mean the aryl group or arylene group.

In this specification, the term alicyclic ring structure means a cyclic hydrocarbon structure other than an aromatic ring structure, unless otherwise specified. The alicyclic ring structure may be, for example, an alicyclic ring structure having 3 to 30 carbon atoms, 3 to 25 carbon atoms, 3 to 21 carbon atoms, 3 to 18 carbon atoms, or 3 to 13 carbon atoms, unless otherwise specified.

In the present application, the term single bond may mean a case where no separate atom is present at the relevant site. For example, in the structure represented by A-B-C, when B is a single bond, it means that no atom exists at a site represented by B, and A is directly connected to C to form a structure represented by A-C.

In the present application, the substituent which may optionally be substituted in an alkyl group, an alkenyl group, an alkynyl group, an alkylene group, an alkenylene group, an alkynylene group, an alkoxy group, an aryl group, an arylene group, a linear chain or an aromatic structure, and the like can be exemplified by a hydroxyl group, a halogen atom, a carboxyl group, a glycidyl group, an acryloyl group, a methacryloyl group, an acryloyloxy group, a methacryloyloxy group, a thiol group, an alkyl group, an alkenyl group, alkynyl group, an alkylene group, an alkenylene group, an alkynylene group, an alkoxy group or an aryl group, and the like, but is not limited thereto.

The present application relates to a method for producing a polymer. The production method of the present application may comprise a step of anionically polymerizing a monomer in the presence of an aromatic organometal compound. It may comprise a step of producing a polymer having a metal at a terminal thereof by the above step. In one example, the metal connected to one terminal of the polymer may be the metal contained in the aromatic organometal compound. In one example, the other moiety of the aromatic organometal compound except for the metal may be connected to the other terminal of the polymer.

The term aromatic organometal compound means a compound comprising an aromatic structure and a metal.

In one example, the aromatic organometal compound may serve as an initiator of anionic polymerization. By using such an aromatic organometal compound and adjusting the ratio of the monomer and the aromatic organometal compound, the polymerization process can be effectively conducted, and a polymer having an appropriate molecular weight and molecular weight distribution can be produced according to the purpose.

Here, the method for performing the anionic polymerization is not particularly limited. For example, the anionic polymerization may be living anionic polymerization in which active terminals are obtained by a growth reaction by anions. When the aromatic organometal compound and the monomer are polymerized by an anionic polymerization method, the organometal compound may be used as an anionic polymerization initiator and polymerized with the monomer. By polymerizing the organometal compound and the monomer with the living anionic polymerization, the metal can be adjusted to be positioned at the terminal of the monomer bonded to the organometal compound and the target polymer whose molecular weight and molecular weight distribution are controlled can be effectively synthesized.

In one example, the organometal compound may be a compound represented by Formula 1 below.

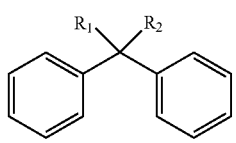

[Formula 1]

In Formula 1, $R_1$ is an alkyl group and $R_2$ is a metal.

The metal may be lithium, sodium or potassium.

In one example, $R_1$ in Formula 1 above may be an alkyl group having 1 or more, 2 or more, 3 or more, 4 or more, or 5 or more carbon atoms, and the number of carbon atoms in the alkyl group may be 20 or less, 18 or less, 16 or less, 14 or less, 12 or less, 10 or less, 8 or less, or 6 or less. The alkyl group may be linear, branched or cyclic, and in one example, it may be branched.

In the production method of the present application, the monomer used in the step of producing a polymer may be, for example, an acrylic monomer. In the present application, the term acrylic monomer may mean acrylic acid, methacrylic acid, an acrylic acid ester or a methacrylic acid ester.

In one example, the monomer to be applied in the production process may be a compound represented by Formula 2 below.

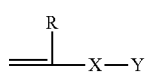

[Formula 2]

In Formula 2, R is hydrogen or an alkyl group, X is an oxygen atom, a sulfur atom, $-S(=O)_2-$, a carbonyl group, $-C(=O)-X_1-$ or $-X_1-C(=O)-$, where $X_1$ is an oxygen atom, a sulfur atom, $-S(=O)_2-$, an alkylene group, an alkenylene group or an alkynylene group, and Y is an alkyl group or an alkylaryl group or an alkyloxyaryl group.

In Formula 2, R may be hydrogen, an alkyl group having 1 to 4 carbon atoms, or an alkyl group having 1 to 2 carbon atoms, but is not limited thereto.

In Formula 2, X is $-S(=O)_2-$, $-C(=O)-X_1-$ or $-X_1-C(=O)-$, where $X_1$ may be an oxygen atom or a sulfur atom.

Also, Y may be an alkyl group, an alkylaryl group or an alkyloxyaryl group, where the alkyl group may be an alkyl group having 1 to 20 carbon atoms, 1 to 16 carbon atoms, 1 to 12 carbon atoms, 1 to 8 carbon atoms or 1 to 4 carbon atoms, or a linear, branched or cyclic alkyl group having 4 to 20 carbon atoms, 8 to 20 carbon atoms, 8 to 16 carbon atoms, 8 to 12 carbon atoms or 12 to 16 carbon atoms.

The compound of Formula 2 can be exemplified by, for example, alkyl (meth)acrylate such as methyl (meth)acrylate, ethyl (meth)acrylate, propyl (meth)acrylate, isopropyl (meth)acrylate, butyl (meth)acrylate, isobutyl (meth)acrylate, t-butyl (meth)acrylate, pnetyl (meth)acrylate, isopentyl (meth)acrylate, 2-ethylhexyl (meth)acrylate, isooctyl (meth) acrylate, nonyl (meth)acrylate, isononyl (meth)acrylate, decyl (meth)acrylate, dodecyl (meth)acrylate, cetyl (meth) acrylate or stearyl (meth)acrylate, or para-alkylphenyl (meth)acrylate or para-alkyloxyphenyl (meth)acrylate such as para-dodecylphenyl (meth)acrylate or para-dodecyloxyphenyl (meth)acrylate, and the like, but is not limited thereto. In this specification, the (meth)acrylate may mean acrylate or methacrylate.

The content of the monomers applied in the production process is not particularly limited. When an input of the monomer is increased upon living anionic polymerization, the number of repeating units of the monomers bonded to the organometal compound may be increased, thereby producing a polymer having a desired repeating unit. The monomer may be contained in a ratio of, for example, 1 mol % to 10,000 mol % relative to a metal-containing compound to be described below.

In one example of the present application, the aromatic organometal compound may be a reaction compound of a mixture comprising an aromatic compound containing a double bond and a metal-containing compound. That is, the aromatic organometal compound can be formed by reacting the mixture comprising the aromatic compound having a double bond and the metal-containing compound. By the reaction, the metal may be substituted for the organometal compound to produce the above-described aromatic organometal compound. By using such a compound as an initiator, polymers having various terminal groups can be efficiently produced.

In one example of the present application, the metal-containing compound may be an organometal compound, a metal halide, or a mixture thereof.

Here, the organometal compound may be, for example, a hydrocarbon compound containing lithium, sodium, potassium, rubidium or cesium. The hydrocarbon compound may be a hydrocarbon compound having 1 to 20 carbon atoms, 1 to 16 carbon atoms, 1 to 12 carbon atoms, 1 to 8 carbon atoms, or 1 to 4 carbon atoms. In one example, the compound may be an alkane, alkene or alkyne with 1 to 20 carbon atoms, 1 to 16 carbon atoms, 1 to 12 carbon atoms, 1 to 8 carbon atoms, or 1 to 4 carbon atoms substituted with at least one metal. When the compound is an alkene or alkyne, the lower limit of the number of carbon atoms is 2. As the metal-containing compound, an alkyl lithium compound such as, for example, methyl lithium, ethyl lithium, propyl lithium, butyl lithium (n-butyl lithium, sec-butyl lithium, isobutyl lithium, t-butyl lithium or the like), pentyl lithium and hexyl lithium may be used, without being limited thereto.

Here, the metal halide may also be lithium halide, where the halogen atom to be contained may be bromine (Br), iodine (I) or chlorine (Cl), but is not limited thereto.

The aromatic compound having a double bond may be a compound represented by Formula 3 below.

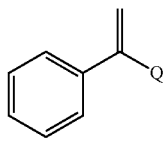

[Formula 3]

In Formula 3, Q is a hydrogen atom, an alkyl group or an aryl group.

The Q may be an alkyl group having 1 to 8 carbon atoms, 1 to 6 carbon atoms, or 1 to 4 carbon atoms. Also, Q may be an aryl group having 6 to 18 carbon atoms or 6 to 12 carbon atoms, but is not limited thereto.

When the Q is an aryl group, the aromatic compound containing a double bond of the present application may contain two or more aromatic ring structures.

The compound of Formula 3 may be, for example, 1,1-diphenylethylene, 1,1-di(p-methylphenyl)ethylene, 1,1-di(m-methylphenyl)ethylene, 1,1-di(p-chlorophenyl)ethylene, 1,1-di(m-chlorophenyl)ethylene, stilbene(trans-1,2-diphenylethylene), isostilbene(cis-1,2-diphenylethylene), trans-1,2-di(p-methylphenyl)ethylene, 1,2-di(m-methylphenyl)ethylene, 1,2-di(p-chlorophenyl)ethylene, 1,2-di(m-chlorophenyl) ethylene, cis-1,2-di(p-methylpheneyl)ethylene, cis-1,2-di(m-methylphenyl) ethylene or cis-1,2-di(p-chlorophenyl), but is not limited thereto.

In one example of the present application, in the mixture comprising the aromatic compound containing a double bond and the metal-containing compound, the aromatic compound may be contained in a ratio of 1 mol % to 60 mol % relative to the metal-containing compound. In another example, the content may be 1 mol % or more, 2 mol % or more, 3 mol % or more, 4 mol % or more, or 5 mol % or more, and may be 30 mol % or less, 28 mol % or less, 26 mol % or less, 24 mol % or less, 22 mol % or less, or 20 mol % or less. In the above range, the side reactions of the polymerization reaction can be effectively suppressed.

In one example, when the metal-containing compound is a mixture of an organometal compound and a metal halide, the ratio (M2/M1) of the molar number (M2) of the metal halide to the molar number (M1) of the organometal compound in the mixture may be in a range of 0.5 to 30. In another example, the ratio (M2/M1) may be about 0.7 or more, 0.9 or more, 1 or more, 1.1 or more, 1.3 or more, or 1.5 or more, or may also be about 29 or less, about 26 or less, about 24 or less, about 22 or less, about 20 or less, or about 19 or less or so.

In one example, in the production method according to the present application, the reaction may be performed at a temperature in a range of −85° C. to −10° C. The reaction temperature may be a reaction temperature in the anionic polymerization step and may be a reaction temperature in the reaction for producing the aromatic organometal compound. In another example, the temperature may be about −85° C. or higher, −83° C. or higher, −81° C. or higher, −80° C. or higher, −78° C. or higher, −76° C. or higher, −74° C. or higher, −72° C. or higher, −70° C. or higher, −68° C. or higher, −66° C. or higher, −64° C. or higher, −62° C. or higher, −60° C. or higher, −58° C. or higher, −56° C. or higher, −54° C. or higher, −52° C. or higher, or −50° C. or higher, −48° C. or higher, or −46° C. or higher, and may be −10° C. or lower, −20° C. or lower, −30° C. or lower, −33° C. or lower, −36° C. or lower, −39° C. or lower, or −42° C. or lower. By performing the anionic polymerization reaction and/or the reaction of the aromatic organometal compound in the above temperature range, it is possible to form a polymer whose molecular weight distribution is controlled, while suppressing side reactions, whereby a desired range of high molecular weight materials can be produced.

In one example, the production method of the present application may further comprise a step of reacting a polymer that a metal is connected to its terminal with a compound containing a halogen atom to form a polymer that a halogen atom is introduced at its terminal. That is, the production method of the present application can be a production method of a polymer which comprises a step of reacting a mixture comprising a polymer containing a metal atom at its terminal obtained by the above step and a compound containing a halogen atom. By the above reaction, a polymer that the halogen atom is introduced at the terminal thereof can be formed.

The compound containing a halogen atom may be a compound represented by Formula 4, 5 or 6 below.

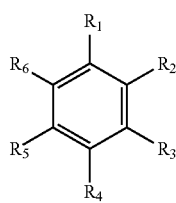

[Formula 4]

In Formula 4, $R_1$ to $R_6$ may each independently be a hydrogen atom, a halogen atom, an alkyl group, an alkenyl group, an alkynyl group, a haloalkyl group, a haloalkenyl group, a haloalkynyl group, an alkylene group, an alkenylene group or an alkynylene group, and the like, where the number of halogen atoms contained in $R_1$ to $R_6$ may be at least one or more, two or more, or three or more. In another example, the number of halogen atoms contained in $R_1$ to $R_6$ may be 10 or less, 9 or less, 8 or less, 7 or less, 6 or less, 5 or less, 4 or less, or 3 or less.

Here, the haloalkyl, haloalkenyl or haloalkynyl group represents an alkyl, alkenyl or alkynyl group substituted with at least one or more halogen atoms.

In one example, at least one or more, two or more, or three or more of $R_1$ to $R_6$ in Formula above may be a haloalkyl group, a haloalkenyl group, or a haloalkynyl group. The number of the haloalkenyl groups, haloalkyl groups or haloalkynyl groups may be 10 or less, 9 or less, 8 or less, 7 or less, 6 or less, 5 or less, 4 or less, or 3 or less.

On the other hand, in Formula 5, n may be a number in a range of 1 to 100, and Y is a halogen atom.

Furthermore, in Formula 6, n is a number in a range of 1 to 100, and Hal is a halogen atom.

In Formulas 5 and 6 above, ns may each independently be a number in the range of 1 to 90, 1 to 80, 1 to 70, 1 to 60, 1 to 50, 1 to 40, 1 to 30, 1 to 20, 1 to 10, 1 to 8, 1 to 6, 1 to 4 or 1 to 2, and the halogen atom may be bromine (Br), iodine (I) or chlorine (Cl), but is not limited thereto.

In Formula 4, the alkyl group, alkenyl group, alkynyl group, haloalkyl group, haloalkenyl group, haloalkynyl group, alkylene group, alkenylene group or alkynylene group may be, for example, an alkyl group, alkyl group, alkenyl group, alkynyl group, haloalkyl group, haloalkenyl group, haloalkynyl group, alkylene group, alkenylene group or alkynylene group, having 1 to 8 carbon atoms or 1 to 6 carbon atoms, but is not limited thereto. The alkyl group, alkylene group, alkenylene group or alkynylene group may be substituted with a halogen atom or may not be substituted with a halogen atom, but at least two or more of the alkyl group, alkylene group, alkenylene group and alkynylene group may be substituted with a halogen atom.

The halogen atom substituted in Formula 4 or the halogen atom contained in Formula 5 may be bromine (Br), iodine (I) or chlorine (Cl), but is not limited thereto.

In one example of the present application, in the reaction mixture comprising a polymer that a metal is introduced at the terminal and a compound containing a halogen atom, the compound containing a halogen atom may be contained in a ratio of about 1 mol % to 20 mol % relative to the molar number of the monomer forming the polymer that a metal is introduced at the terminal. The compound containing a halogen atom may be 1.5 mol % or more or 2 mol % or more of the metal-containing compound, and in another example, it may also be about 18 mol % or less, about 16 mol % or less, about 14 mol % or less, about 12 mol % or less, about 10 mol % or less, about 8 mol % or less, about 6 mol % or less, about 5 mol % or less, or about 4 mol % or less.

The reaction, i.e., the reaction of a mixture comprising a polymer containing a metal atom at the terminal and a compound containing a halogen atom, can also be performed at a temperature in the range of −85° C. to −10° C. In one example, subsequent to the process of producing a polymer containing a metal atom at the terminal, the compound containing a halogen atom can be continuously introduced to perform a subsequent reaction. In another example, the temperature may be about −85° C. or higher, −83° C. or higher, −81° C. or higher, −80° C. or higher, −78° C. or higher, −76° C. or higher, −74° C. or higher, −72° C. or higher, −70° C. or higher, −68° C. or higher, −66° C. or higher, −64° C. or higher, −62° C. or higher, −60° C. or higher, −58° C. or higher, −56° C. or higher, −54° C. or higher, −52° C. or higher, −50° C. or higher, −48° C. or higher, or −46° C. or higher, and may be −10° C. or lower, −20° C. or lower, −30° C. or lower, −33° C. or lower, −36° C. or lower, −39° C. or lower, or −42° C. or lower. By performing the reaction in the above temperature range, it is possible to form a polymer whose molecular weight distribution is controlled, while suppressing side reactions, whereby a desired range of high molecular weight materials can be produced.

The method for producing a polymer of the present application may include, if necessary, a solvent, a side reaction inhibitor, etc. in addition to the organometal compound and the compound containing a halogen atom as described above.

As the solvent applicable to the production method of the present application, an ether solvent such as diethyl ether, tetrahydrofuran, dioxane, trioxane, dimethoxyethane and toluene; an aromatic hydrocarbon solvent such as ethylbenzene; a tertiary amine-based solvent such as tetramethylethylenediamine (TMEDA) and hexamethylphosphoric triamide (HMPA), and a mixed solvent consisting of two or more thereof may be used, without being limited thereto.

In addition, as the side reaction inhibitor applicable to the production method of the present application, a lithium-containing substance such as LiCl, LiOH, LiBr, LiOBu and LiN(Et)$_2$, Et$_2$Zn (diethylzinc), trioctylaluminium ([CH$_3$(CH$_2$)$_7$]Al) may be used, without being limited thereto.

The polymer of the production method according to the present application may have a molecular weight distribution of 1.4 or less. In this specification, the term number average molecular weight, weight average molecular weight or molecular weight distribution (PDI) may mean a converted value for standard polystyrene measured by GPC (gel permeation chromatograph), as described in Examples to be described below, and the term molecular weight means a number average molecular weight, unless otherwise specified. The molecular weight distribution (PDI: Mw/Mn), that is, the ratio (Mw/Mn) of the weight average molecular weight (Mw) to the number average molecular weight (Mn), of the polymer may be 1.4 or less, 1.37 or less, 1.34 or less, 1.31 or less, 1.28 or less, 1.25 or less, or 1.22 or less, and the lower limit is not particularly limited, but it may be, for example, 1.01 or more, or 1.04 or more. The polymer having the molecular weight distribution may be a polymer that a metal atom is introduced at the terminal or a polymer that a halogen atom is introduced at the terminal.

The polymer according to the production method of the present application may have a number average molecular weight (Mn) of 10,000 or more. The number average molecular weight may be, for example, 10,100 or more, 10,300 or more, 10,600 or more, 10,900 or more, 11,200 or more, or 11,500 or more. In another example, the number average molecular weight may be about 100,000 or less, 90,000 or less, 80,000 or less, 70,000 or less, 60,000 or less, 50,000 or less, or 40,000 or less.

The polymer of the present application formed in such a manner can be applied to various applications including a macro initiator for further reaction and the like.

Advantageous Effects

The present application can produce a polymer containing metal atoms or halogen atoms at the terminals thereof with excellent efficiency while minimizing or eliminating side reactions or the like, and can also freely control molecular weight characteristics of the polymer.

BRIEF DESCRIPTION OF DRAWINGS

FIGS. 1 to 9 show NMR analysis results of the materials produced in Examples.

MODE FOR INVENTION

Hereinafter, the present application will be described more in detail by way of examples according to the present application and comparative examples, but the scope of the present application is not limited by the following examples.

1. NMR Measurement

The NMR analysis was performed at room temperature using an NMR spectrometer including a Varian Unity Inova (500 MHz) spectrometer with a triple resonance 5 mm probe. An analyte was diluted in a solvent for measuring NMR (CDCl$_3$) to a concentration of about 10 mg/ml and used, and chemical shifts were expressed in ppm.

2. GPC (Gel Permeation Chromatograph)

The number average molecular weight (Mn) and the molecular weight distribution were measured using GPC (Gel Permeation Chromatography). Analytical polymers were introduced into a 5 mL vial and diluted in THF (tetrahydrofuran) so as to be a concentration of about 1 mg/mL. Subsequently, the calibration standard sample and the the analytical sample were filtered through a syringe filter (pore size: 0.45 μm) and measured. As an analytical program, ChemStation from Agilent Technologies was used, and the elution time of the sample was compared with the calibration curve to obtain the weight average molecular weight (Mw) and the number average molecular weight (Mn), respectively, and to calculate the molecular weight distribution (PDI) from the ratio (Mw/Mn).

The measurement conditions of GPC are as follows.

<GPC Measurement Conditions>

Devices: 1200 series from Agilent Technologies
Column: using two PLgel mixed B from Polymer laboratories
Solvent: THF (tetrahydrofuran)
Column temperature: 35° C.
Sample concentration: 1 mg/mL, 200 μL injection
Standard samples: polystyrene (Mp: 3900000, 723000, 316500, 52200, 31400, 7200, 3940, 485)

Example 1

A compound of Formula A below was synthesized. Diphenylethylene (0.1803 g, 1 mmol), sec-butyllithium (0.06401 g, 1 mmol) and lithium chloride (LiCl) (0.4239 g, 10 mmol) were placed in a 1000 mL flask, dissolved in 500 mL of tetrahydrofuran, and then reacted at −45° C. for about 10 minutes under an argon condition to form a compound of Formula A1 below. Methyl methacrylate (10.41 g, 104 mmol) was added thereto and reacted at the same temperature (−45° C.) for about 1 hour. Subsequently, by using tetrahydrofuran in column chromatography, a compound of Formula A below (10.4 g, number average molecular weight 11,300, molecular weight distribution 1.18) in a white solid was obtained with a yield of about 99.5%. The NMR results of the obtained compound of Formula A were described in FIG. 1.

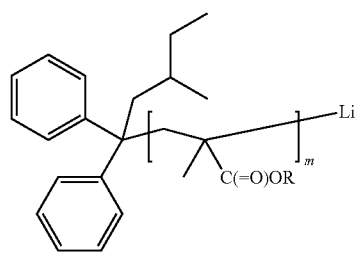

[Formula A]

In Formula A, R is a methyl group.

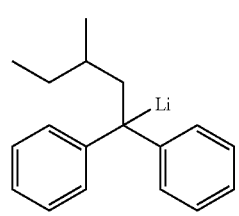

[Formula A1]

Example 2

Diphenyletylene (0.185 g, 1.1 mmol), sec-butyllithium (0.385 g, 0.700 mmol) and lithium chloride (LiCl) (0.4 g, 9.44 mmol) were placed in a 1000 mL flask, dissolved in 250 mL of tetrahydrofuran, and then reacted at −78° C. for about 10 minutes under a nitrogen condition, and methyl methacrylate (6.85 g, 68.4 mmol) was added thereto and reacted at the same temperature (−78° C.) for 1 hour. A white solid polymer (10.4 g, number average molecular weight 11,300, molecular weight distribution 1.18) was obtained with a yield of about 99.5%, using tetrahydrofuran in column chromatography. The NMR results of the obtained compound were described in FIG. 2.

Example 3

A compound of Formula A was obtained in the same manner as in Example 1, except that the amount of methyl methacrylate to be added was adjusted to 50 mmol. The number average molecular weight of the obtained compound was about 16,700 or so, and the molecular weight distribution was about 1.15 or so. The NMR results of the obtained compound were shown in FIG. 3.

Example 4

Instead of methyl methacrylate, para-dodecyloxyphenyl methacrylate was applied. Amounts of the applied dodecyloxyphenyl methacrylate, sec-butyllithium and diphenylethylene were adjusted to 22.5 mmol, 0.910 mmol and 1.37 mmol, respectively to obtain the target product in the same manner as in Example 1. The obtained polymer was a substance in which R in Formula A of Example 1 was a para-dodecyloxyphenyl group, and the NMR results thereof were shown in FIG. 4. In the case of Example 4, monomers were precipitated in the reaction process as compared with Example 1, and it was difficult to obtain the target product having a high molecular weight. In addition, the number average molecular weight of the obtained polymer was about 8,400 or so, and the molecular weight distribution was about 1.19 or so.

Example 5

The reaction was performed in the same manner as in Example 4, except that the amount of dodecyloxyphenyl methacrylate to be added was adjusted to 50 mmol and the reaction temperature was adjusted to 25° C. In the case of Example 5, molecular weight materials of different sizes were formed due to the side reaction as a result of GPC analysis, and the molecular weight distribution was higher than those of the other examples. In the case of Example 5, the number average molecular weight was about 25,100 or so, and the molecular weight distribution was about 2.01 or so.

Example 6

The reaction was performed in the same manner as in Example 4, except that the amount of dodecyloxyphenyl methacrylate to be added was adjusted to 24.2 mmol, the amount of sec-butyllithium was adjusted to 0.700 mmol, the amount of diphenylethylene was adjusted to 1.05 mmol and the reaction temperature was adjusted to 0° C. In the case of Example 6, molecular weight materials of different sizes were formed due to the side reaction as a result of GPC analysis, and the molecular weight distribution represented a high result. In the case of Example 6, the number average molecular weight was about 11,800 or so, and the molecular weight distribution was about 1.51 or so.

Example 7

The reaction was performed in the same manner as in Example 4, except that the amount of dodecyloxyphenyl methacrylate was adjusted to 23.9 mmol, the amount of sec-butyllithium was adjusted to 0.700 mmol, the amount of diphenylethylene was adjusted to 1.01 mol and the reaction temperature was adjusted to −45° C. In the case of Example 7, the number average molecular weight of the target product was about 11,300 or so, and the molecular weight distribution was about 1.07 or so.

Example 8

The reaction was performed in the same manner as in Example 7, except that the amount of dodecyloxyphenyl methacrylate to be added was adjusted to 24.8 mmol, the amount of sec-butyllithium was 0.560 mmol and the amount of diphenylethylene was adjusted to 0.84 mmol. In the case of Example 8, the number average molecular weight of the target product was about 15,500 or so, and the molecular weight distribution was about 1.09 or so. FIG. 5 is NMR results for the target product.

Example 9

The reaction was performed in the same manner as in Example 7, except that the amount of dodecyloxyphenyl methacrylate to be added was adjusted to 27.2 mmol, the amount of sec-butyllithium was 0.420 mmol and the amount of diphenylethylene was adjusted to 0.63 mmol. In the case of Example 9, the number average molecular weight of the target product was about 27,800 or so, and the molecular weight distribution was about 1.12 or so. FIG. 6 is NMR results for the target product.

Example 10

Diphenylethylene (0.1803 g, 1 mmol), sec-butyllithium (0.06401 g, 1 mmol) and lithium chloride (LiCl) (0.4239 g, 10 mmol) were placed in a 1000 mL flask, dissolved in 500 mL of tetrahydrofuran, and then reacted at −45° C. for about 10 minutes under a nitrogen condition, para-dodecyloxyphenyl methacrylate (12.7207 g, 50 mmol) was added thereto, and reacted at the same temperature (−45° C.) to prepare an intermediate. The intermediate prepared at this point is the same as the target product prepared in Example 4 above. Subsequently, 1,3,5-tris(bromomethyl)benzene (0.3569 g, 1 mmol) was added thereto and further reacted for 12 hours. After the reaction, a white solid polymer (17.3 g, number average molecular weight 16,700, molecular weight distribution 1.15) was obtained with a yield of about 99.8%, using tetrahydrofuran in column chromatography. The NMR results of the obtained polymer were shown in FIG. 7.

Example 11

Diphenylethylene (0.174 g, 0.966 mmol), sec-butyllithium (0.354 g, 0.644 mmol) and lithium chloride (LiCl) (0.5 g, 11.8 mmol) were placed in a 1000 mL flask, dissolved in 250 mL of tetrahydrofuran, and then reacted at −45° C. for about 10 minutes under a nitrogen condition. Subsequently, para-dodecylphenyloxy methacrylate (8.6 g, 24.8 mmol) was added thereto and reacted at the same temperature (−45° C.) to prepare an intermediate. The intermediate prepared at this point is the same as the target product prepared in Example 8 above. Subsequently, epibromohydrin (0.342 g, 2.5 mmol) was added thereto and further reacted for 12 hours. After the reaction, a white solid polymer (8.7 g, number average molecular weight 15,700, molecular weight distribution 1.12) was obtained with a yield of about 96.1%, using tetrahydrofuran in column chromatography. The NMR results of the obtained polymer were shown in FIG. 8.

Example 12

Diphenyletylene (0.185 g, 1.1 mmol), sec-butyllithium (0.385 g, 0.700 mmol) and lithium chloride (LiCl) (0.4 g, 9.44 mmol) were placed in a 1000 mL flask, dissolved in 250 mL of tetrahydrofuran and then reacted at −78° C. for about 10 minutes under a nitrogen condition, methyl methacrylate (6.85 g, 68.4 mmol) was added thereto and reacted at the same temperature (−78° C.) to prepare an intermediate. The intermediate prepared at this point is the same as the target product prepared in Example 2 above. Subsequently, epibromohydrin (0.479 g, 3.5 mmol) was added thereto and further reacted for 4 hours. After the reaction, a white solid polymer (6.58 g, number average molecular weight 11,300, molecular weight distribution 1.12) was obtained with a yield of about 93.0%, using tetrahydrofuran in column chromatography. The NMR results of the obtained polymer are as shown in FIG. 9.

The invention claimed is:

1. A method for producing a polymer, comprising:
   reacting a first mixture containing an aromatic compound having a double bond and a metal-containing compound to produce an aromatic organometal compound;
   anionically polymerizing a monomer in the presence of the aromatic organometal compound to produce a polymer having a metal at a terminal thereof; and
   reacting a second mixture of the polymer having a metal at the terminal thereof and a compound containing at least two halogen atom to form a polymer having a halogen atom at a terminal thereof,
   wherein the metal-containing compound comprises an organometal compound and a metal halide, and a ratio (M2/M1) of a molar number (M2) of the metal halide to a molar number (M1) of the organometal compound in the mixture is in a range of 1 to 30,
   wherein the compound containing a halogen atom is included in the second mixture in a molar ratio of 1 mol % to 10 mol % relative to the monomer forming the polymer having a metal at a terminal thereof,
   wherein the monomer is represented by Formula 2,

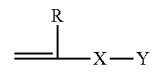

[Formula 2]

wherein, R is hydrogen or an alkyl group,
X is an oxygen atom, a sulfur atom, —S(=O)$_2$—, a carbonyl group, —C(=O)—X$_1$— or —X$_1$—C (=O)—, wherein X$_1$ is an oxygen atom, a sulfur atom, —S(=O)$_2$—, an alkylene group, an alkenylene group or an alkynylene group, and
Y is an alkylaryl group or an alkyloxyaryl group, wherein the compound containing at least two halogen atoms is represented Formula 4,

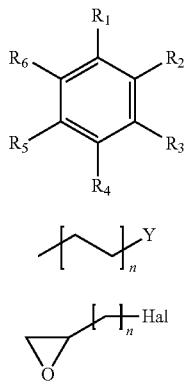

[Formula 4]

[Formula 5]

[Formula 6]

wherein, $R_1$ to $R_6$ are each independently hydrogen, an alkenyl group, an alkynyl group, a haloalkyl group, a haloalkenyl group, a haloalkynyl group, an alkylene group, an alkenylene group or an alkynylene group, where the number of halogen atoms contained in $R_1$ to $R_6$ is two or more,
wherein the reaction of the first mixture to produce the aromatic organometal compound is performed at a temperature in a range of −60° C. to −36° C., and
wherein the reacting of the second mixture to form the polymer having a halogen atom at a terminal thereof is performed at a temperature in a range of −60° C. to −36° C.

2. The method for producing a polymer according to claim 1, wherein the aromatic organometal compound is represented by Formula 1:

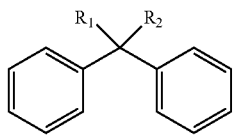

[Formula 1]

wherein, $R_1$ is an alkyl group and $R_2$ is a metal.

3. The method for producing a polymer according to claim 1, wherein the monomer is an acrylic monomer.

4. The method for producing a polymer according to claim 1, wherein the anionic polymerizing is performed at a temperature in a range of −85° C. to −10° C.

5. The method for producing a polymer according to claim 1, wherein the organometal compound is a hydrocarbon compound with 1 to 16 carbon atoms containing lithium, sodium, potassium, rubidium or cesium.

6. The method for producing a polymer according to claim 1, wherein the aromatic compound having a double bond is represented by Formula 3:

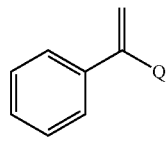

[Formula 3]

wherein, Q is a hydrogen atom, an alkyl group or an aryl group.

7. The method for producing a polymer according to claim 1, wherein the aromatic compound containing a double bond is included in the first mixture in an amount in a range of 1 mol % to 60 mol % relative to the metal-containing compound.

8. The method for producing a polymer according to claim 1, wherein the polymer having a halogen atom at a terminal thereof has a molecular weight distribution of 1.4 or less.

9. The method for producing a polymer according to claim 1, wherein the polymer having a halogen atom at a terminal thereof has a number average molecular weight of 10,000 or more.

10. The method for producing a polymer according to claim 1, wherein the halogen atom is bromine (Br), iodine (I) or chlorine (Cl).

* * * * *